July 16, 1957  H. G. SCHWARZ  2,799,313
SHREDDER TYPE JUICE EXTRACTOR
Filed Nov. 15, 1954  2 Sheets-Sheet 1
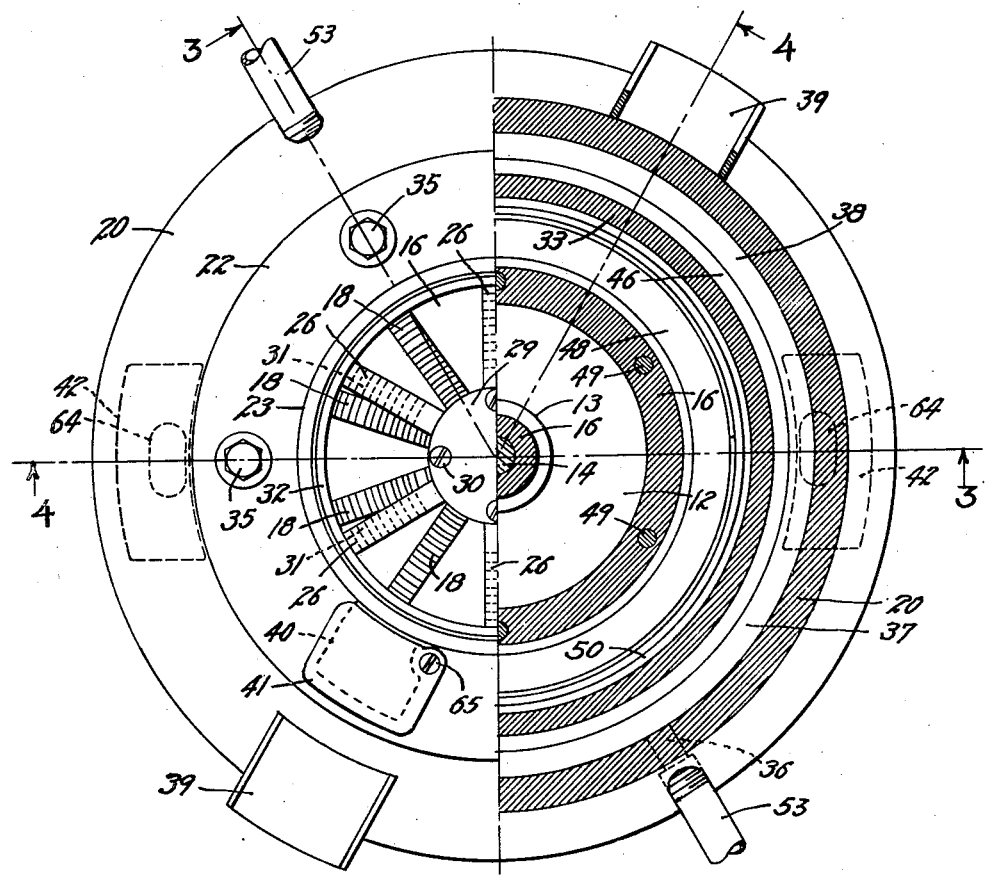
Fig 1
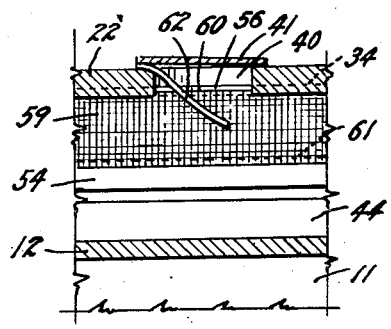
Fig 2
INVENTOR.
HENRY G. SCHWARZ
BY
ATTORNEY

INVENTOR.
HENRY G. SCHWARZ

United States Patent Office 2,799,313
Patented July 16, 1957

2,799,313

SHREDDER TYPE JUICE EXTRACTOR

Henry G. Schwarz, Menlo Park, Calif., assignor to Agnes K. Schwarz, Menlo Park, Calif.

Application November 15, 1954, Serial No. 468,768

7 Claims. (Cl. 146—76)

This invention relates to an extractor for centrifugally extracting juice from any desired type of juice-containing pulp, and while more particularly designed for comminuting and extracting juice from fruits and vegetables, it will be found valuable in many applications of juice extraction, such as the fish oil industry and the like.

The principal object of the invention is to provide a juice extractor which will have a higher capacity and more efficient juice extraction than present extractors, and which will produce a clean pulp free of juice with a minimum of lost time for cleaning, depulping, and the like.

Another object of the invention is to provide an interchangeable extractor which will avoid the use of a screen on pulps where a screen cannot be used advantageously, and which can be quickly adapted to the use of a screen on pulps and juices where such an adaptation is preferred.

A further object is to provide a machine in which frictional contacts will be reduced to a minimum, and which will have only one moving unit to reduce replacements and repairs to a minimum.

A still further object is to provide a centrifugal extractor construction in which contact between the atmosphere and the juices will be reduced to a minimum to prevent destruction of vitamins and oxidation of the juices.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved centrifugal juice extractor, showing the latter partially in section, the sectional portion being taken on the line 1—1, Fig. 3;

Fig. 2 is a fragmentary, vertical section, taken on the line 2—2, Fig. 4;

Figure 3:
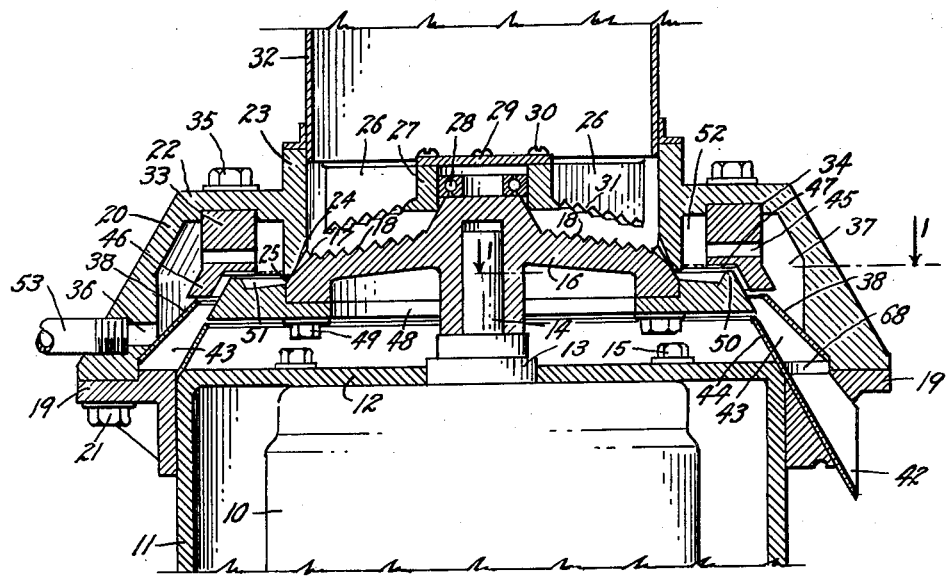
Fig. 3 is a developed cross-section through the extracting portion of the improved extractor, taken on the line 3—3, Fig. 1, with one type of rotor in place therein.

In the drawings, an electric drive motor is indicated at 10 positioned within a cylindrical motor casing 11. The lower portions of the motor 10 and the casing 11 are not illustrated, for they may have any desired shape and base support as is customary in the extractor art. The casing 11 is closed by means of a top plate 12 through which a bearing 13 and a shaft 14 of the motor 10 project. The motor is supported in the casing 11 from the top plate 12 by means of suitable cap screws 15.

A shredding rotor 16 is keyed or otherwise secured on the shaft 14 so as to rotate in a horizontal plane. The upper surface of the rotor 16 is conically inclined toward a bevel-toothed, peripheral overflow edge 17 which is inclined sharply downwardly around the periphery of the rotor 16. The upper conical surface of the rotor 16 is provided with a plurality of radially extending bands of shredding teeth 18.

The casing 11 is provided with a circumferential top flange 19 to which a truncated-conical rotor housing 20 is secured in any desired manner, such as by means of cap screws 21 which extend upwardly through the flange 19 and are threaded into the rotor housing 20. The rotor housing extends upwardly and inwardly around a periphery of the rotor 16, thence inwardly to form a flat top portion 22 which terminates in a concentrically positioned feed throat sleeve 23 which is integral with and projects upwardly and downwardly from the flat top portion 22.

The lower edge of the sleeve 23 is provided with inclined or beveled shredding teeth 24 positioned in closely spaced relation to the beveled teeth of the overflow edge 17. Both the teeth 18 and the teeth 24 decrease in depth as the outer periphery is approached to provide a relatively narrow, toothed, annular discharge throat 25.

A plurality of radial spokes 26 extend inwardly from the sleeve 23 to support a bearing box 27 in concentric alignment with the motor shaft 14. The bearing box contains a conventional ball thrust bearing 28 against which the top of the rotor 16 bears. The bearing box is closed by means of a cap plate 29 held in place by means of suitable screws 30.

The bottom edges of the spokes 26 incline downwardly toward the discharge throat 25 in close proximity to, and at a greater angle than, the conical upper surface of the rotor 16. These inclined lower edges on the spokes 26 are also provided with shredding teeth 31 which cooperate with the teeth on the rotor to shred and comminute the material to be de-juiced, which is fed to the rotor from a feed hopper 32 of any desired design fitted into the upper extremity of the feed throat sleeve 23.

The rotor housing 20 is provided with one or more juice outlets 36 (two being shown) which receive juice from an annular juice chamber 37 having a conically inclined bottom plate 38. The rotor housing is also provided with one or more pulp discharge chutes 39 (two being shown) adapted to receive pulp from pulp pockets 40 formed in the top portion 22 and normally closed by means of cover plates 41 held in place by suitable screws 65. The rotor housing 20 is also provided with one or more combination spouts 42 (two being shown) which communicate with an annular chamber 43 having a relatively steep conical bottom plate 44 and the top of which is closed by the bottom plate 38 of the juice chamber 37. The combination spouts 42 discharge either juice or pulp, depending upon which of two internal arrangements is being used.

FIRST ARRANGEMENT

In one internal arrangement a separating ring 33 is inset upwardly into an annular receiving groove 34 in the top portion 22 of the rotor housing 20 and is supported therein by means of suitable cap screws 35. The separating ring 33 is provided with a plurality of juice passages 45 which discharge into the juice chamber 37 over an annular drip lip 46 formed on the lower external edge of the ring 33. The bottom of the ring 33, inward from the lip 46, is serrated, as shown at 47.

An annular rotor rim member 48 is attached about the rotor 16 by means of cap screws 49. The upper surface of the rim member 48 extends conically outward and downward, terminating in an upstanding annular bead 50 which forms an annular pulp pocket 51 below the ring 33. The upper edge of the bead 50 travels in exceedingly close proximity to the serrations 47 in the bottom of the ring 33 so as to form a pulp trap between the stationary serrations 47 and the upper edge of the bead 50, and to form an annular dissecting mechanism for the pulp around the entire periphery of the rim 48.

*Operation of first arrangement*

Let us assume that the rotor is being rapidly rotated by the motor 10 and that fruit is being fed into the feed hopper 32. The fruit will descend between the spokes 26 and will be slashed and shredded by the rotating teeth 18. The latter teeth will tend to rotate the fruit beneath the teeth 31 of the spokes to assist in the masticating of the pulp. As the particles of pulp move outwardly under the influence of centrifugal force they will be reduced in size due to the fact that the two sets of teeth 18 and 31 approach each other toward the periphery of the rotor. When sufficiently reduced in particle size, the pulp will pass into and between the peripheral teeth 17 of the rotor and the stationary teeth 24 of the feed throat sleeve 23 where they will be dissected to exceedingly small pulp particles. This exceedingly fine pulp will travel outwardly and pack in the annular pulp pocket 51, forming an annular juice dam therein. The pulp in the juice dam will work between the serrations 47 of the ring 33 and the bead 50 and will be thrown tangentially into the annular chamber 43 from which it will discharge through the combination spouts 42. The pulp passing between the serrations 47 will be constantly replaced by incoming pulp so that the annular pulp dam is maintained in the pulp socket 51 as long as fruit is fed to the extractor.

It can be seen from the above that the pulp particle size is reduced to the point where every juice-containing cell of the fruit or other material is broken open to release the juice therefrom. This juice is centrifugally pumped from the rotor 16 through the teeth 17 and 24 into a juice cavity 52 between the ring 33 and the sleeve 23, where it is stopped by the pulp dam in the pulp pocket 51 and caused to rise and flow through the juice passages 45 to the juice chamber 37 and from thence through the juice outlets 36 and juice conduits 53.

SECOND ARRANGEMENT

Figure 4:
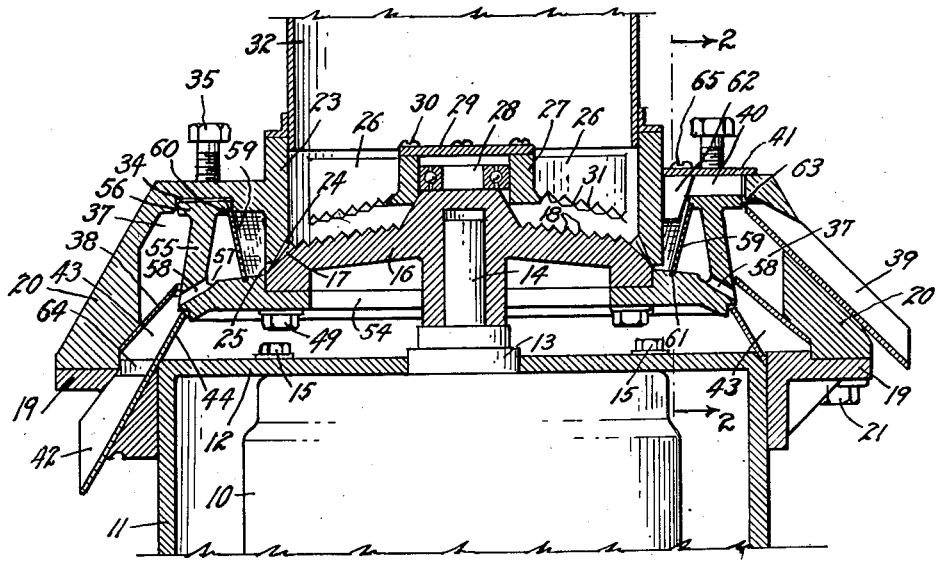
Fig. 4 is a similar developed cross-section, taken on the line 4—4, Fig. 1, with an alternate type of rotor in place therein.

In the second arrangement of the extractor, for use on materials in which it is desirable to replace the pulp dam of the first arrangement with a screen, the rotor rim member 48 is removed from the rotor 16 by loosening the screws 49 and the separating ring 33 is removed from the housing 20 by loosening the screws 35. A second rotor rim 54 (see Fig. 4) is secured to the rotor 16 by means of the screws 49 in the place formerly occupied by the rotor rim member 48. The second rim 54 is provided with an upwardly and inwardly extending side wall having a T-shaped cross-section so as to provide an annular top flange 56 of a diameter and width to snugly and rotatably fit into the annular groove 34 formerly occupied by the separating ring 33, the screws 35 being unscrewed sufficiently so as not to interfere, as shown in Fig. 4.

The upper surface of the second rim 54 is inclined downwardly and outwardly to a peripheral juice groove 57 from which a plurality of juice passages 58 discharge. A circular screen band 59 is inset in the rim 54 between the upper surface of the latter and the axial portion of the T-shaped top flange 56. The flange 56 is preferably notched, as shown at 60, to receive the upper edge of the screen band 59, and the top of the rim 54 is notched, as shown at 61, to receive the bottom of the screen band 59. The screen band 59 has a greater diameter at its top than at its bottom so that it will incline outwardly in cross-section.

*Operation of second arrangement*

Let us assume that the rotor 16 is rotating and that fruit to be juiced is being fed into the feed hopper 32. The fruit will be desiccated and shredded by the rotor 16, as previously described, and both the juice and the pulp will flow through the discharge throat 25 into the annular juice cavity 52 and will be thrown and pressed by centrifugal force against the screen band 59.

The pulp will travel upwardly on the screen band 59 due to the gradually increasing diameter of the screen band until it reaches the top edge thereof and will ride against the top portion 22 of the housing until it reaches one of the pulp pockets 40, where it will overflow the top of the rotating flange 56 and be thrown into the pulp discharge chutes 39 for discharge from the extractor. A plurality of screening teeth 63 are formed on and project downwardly from the top portion 22 over the throat of each discharge chute 39 to prevent large pieces of pulp from being discharged until they have been fully masticated.

For certain materials it may be desirable to assist the pulp in climbing the screen band 59. This may be accomplished by placing an inclined, hook-shaped scraper blade 62 beneath each of the cover plates 41 so that the blades 62 will enter between the feed throat sleeve 23 and the screen band 59. The rotating ring of pulp on the screen band will strike the blades 62 and will be scraped upwardly into the pulp pockets 40 due to the inclined hook-shape of the latter.

The juice will flow through the screen band 59 and will be deflected into the juice groove 57 by the inclined side wall 55, thence through the juice passages 58 into the annular chamber 43. From the chamber 43 the juice will flow into juice pockets 64 indented in the top of the flange 19, and from thence to the combination spouts 42 and from the extractor.

Thus, it can be seen that the spouts 42 conduct juice when the second rotor rim 54 is in place, and conduct pulp when the first rotor rim 48 and the separating ring 33 are in place. The only change necessary to convert the extractor from a non-screen type to a screen type is to remove the separating ring 30 and the rotor rim 48 and replace the latter with the second rotor rim 54.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A juice extractor comprising: a vertical, motor-driven drive shaft; a rotor mounted on the upper extremity of said shaft, said rotor having a conical upper surface inclining downwardly from an axial apex to the periphery thereof; a stationary, cylindrical feed throat sleeve positioned concentrically above said rotor; an inclined lower edge on said throat sleeve; an inclined peripheral edge on said rotor positioned below the inclined lower edge on said sleeve and in close proximity thereto to form a restricted discharge throat; radially extending spokes formed in said throat sleeve; shredding teeth formed in the bottom edges of said spokes above said rotor, said bottom edges being inclined in a similar direction to the inclined upper surface of said rotor; an annular, pulp-receiving rim of larger diameter than said rotor secured to the latter to receive the pulp and juices discharging from said discharge throat; a rotor housing surrounding said rim; a separating ring mounted in said housing above the peripheral edge of said pulp-receiving rim, said ring being in close juxtaposition to said rim to retard pulp below said ring so as to form a pulp dam for the juice below said ring; juice passages formed through said ring; an annular juice chamber in said housing about said ring receiving juice through said ring through said passages; an annular pulp chamber in said housing below said juice chamber receiving pulp from below said ring; and juice and pulp discharges in said housing communicating with said juice and pulp chambers respectively.

2. A juice extractor as described in claim 1 having a raised, annular bead extending upwardly from the periphery of said rim into close proximity to the bottom of said ring to form an annular pulp pocket below the latter; and serrations formed in the bottom of said ring above said bead to masticate and discharge the pulp from said pocket.

3. A juice extractor comprising: a vertical, motor-driven drive shaft; a rotor mounted on the upper extremity of said shaft, said rotor having a conical upper surface inclining downwardly from an axial apex to the periphery thereof; a stationary, cylindrical feed throat sleeve positioned concentrically above said rotor; an inclined lower edge on said throat sleeve; an inclined peripheral edge on said rotor positioned below the inclined lower edge on said sleeve and in close proximity thereto to form a restricted discharge throat; radially extending spokes formed in said throat sleeve; shredding teeth formed in the bottom edges of said spokes above said rotor, said bottom edges being inclined in a similar direction to the inclined upper surface of said rotor; an annular, pulp-receiving rim of larger diameter than said rotor secured to the latter to receive the pulp and juices discharging from said discharge throat; a rotor housing surrounding said rim; an annular, upturned, inwardly inclined side wall formed on and surrounding said rim, the upper edge of said wall traveling in an annular groove in said housing, there being juice passages formed in said side wall adjacent the bottom thereof; an annular, outwardly inclined screen band positioned on said rim and extending upwardly from the latter to contact with said side wall adjacent the top of the latter and acting to screen the juice passing to said passages; a juice chamber in said housing positioned to receive juice centrifugally discharging from said passages; means for discharging juice from said juice chamber; and means for removing pulp from said screen band.

4. A juice extractor as described in claim 3 in which the means for removing pulp from said screen band comprises: pulp pockets formed in said housing above said screen band into which the pulp will be forced in consequence of centrifugal force forcing the pulp against the outward incline of said screen band; and means for discharging the pulp from said pockets.

5. A juice extractor as described in claim 4 having inclined blades extending downwardly from said housing adjacent the inner face of said screen band and positioned to scrape the pulp from the inner face of said screen band into said pulp pockets.

6. A juice extractor comprising: a vertical, motor-driven drive shaft; a rotor mounted on the upper extremity of said shaft, said rotor having a conical upper surface inclining downwardly from an axial apex to the periphery thereof; a stationary, cylindrical feed throat sleeve positioned concentrically above said rotor and in close proximity thereto to form a circular restricted discharge throat about said rotor; an annular, pulp-receiving rim of larger diameter than said rotor secured to the latter to receive the pulp and juices discharging from said discharge throat; a rotor housing surrounding said rim; a separating ring mounted in said housing above the peripheral edge of said pulp-receiving rim, said ring being in close juxtaposition to said rim to retard pulp below said ring so as to form a pulp dam for the juice below said ring; juice passages formed through said ring; an annular juice chamber in said housing about said ring receiving juice through said ring through said passages; an annular pulp chamber in said housing below said juice chamber receiving pulp from below said ring; and juice and pulp discharges in said housing communicating with said juice and pulp chambers respectively.

7. A juice extractor comprising: a vertical, motor-driven drive shaft; a rotor mounted on the upper extremity of said shaft, said rotor having a conical upper surface inclining downwardly from an axial apex to the periphery thereof; a stationary, cylindrical feed throat sleeve positioned concentrically above said rotor and in close proximity thereto to form a circular restricted discharge throat about said rotor; an annular, pulp-receiving rim of larger diameter than said rotor secured to the latter to receive the pulp and juices discharging from said discharge throat; a rotor housing surrounding said rim; an annular, upturned, inwardly inclined side wall formed on and surrounding said rim, the upper edge of said wall traveling in an annular groove in said housing, there being juice passages formed in said side wall adjacent the bottom thereof; an annular, outwardly inclined screen band positioned on said rim and extending upwardly from the latter to contact with said side wall adjacent the top of the latter and acting to screen the juice passing to said passages; a juice chamber in said housing positioned to receive juice centrifugally discharging from said passages; means for discharging juice from said juice chamber; and means for removing pulp from said screen band.

References Cited in the file of this patent

UNITED STATES PATENTS

| | | |
|---|---|---|
| 2,109,048 | Lorenzen | Feb. 22, 1938 |
| 2,180,877 | Lorenzen | Nov. 21, 1939 |
| 2,267,048 | Schwarz | Dec. 23, 1941 |
| 2,389,862 | McGihon | Nov. 27, 1945 |
| 2,481,848 | Lapps | Sept. 13, 1949 |
| 2,519,198 | Richeson | Aug. 15, 1950 |
| 2,527,695 | Bennett | Oct. 31, 1950 |